United States Patent
Singh et al.

(10) Patent No.: US 9,319,844 B2
(45) Date of Patent: Apr. 19, 2016

(54) DETERMINING LOCATION BASED ON BOTH A DETECTED LOCATION AND A PREDICTED LOCATION

(71) Applicant: Aruba Networks, Inc., Sunnyvale, CA (US)

(72) Inventors: Abhishek R. Singh, Pleasanton, CA (US); Anant Kumar, San Jose, CA (US); Varun A. Shah, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/262,554

(22) Filed: Apr. 25, 2014

(65) Prior Publication Data

US 2015/0312721 A1 Oct. 29, 2015

(51) Int. Cl.
| | |
|---|---|
| *H04W 24/00* | (2009.01) |
| *H04W 4/02* | (2009.01) |
| *H04L 29/08* | (2006.01) |
| *H04W 4/04* | (2009.01) |
| *G01S 5/02* | (2010.01) |
| *H04W 64/00* | (2009.01) |

(52) U.S. Cl.
CPC ............ *H04W 4/028* (2013.01); *G01S 5/0294* (2013.01); *H04L 29/08657* (2013.01); *H04W 4/04* (2013.01); *H04W 64/00* (2013.01)

(58) Field of Classification Search
CPC ... H04W 64/00; H04W 4/02; H04L 29/08657
USPC .................. 455/456.1, 456.5, 456.6
See application file for complete search history.

(56) References Cited

U.S. PATENT DOCUMENTS

| | | | |
|---|---|---|---|
| 7,525,484 B2 * | 4/2009 | Dupray et al. ................. 342/450 |
| 8,661,121 B1 | 2/2014 | Mendis | |
| 2007/0287473 A1 * | 12/2007 | Dupray ....................... 455/456.1 |
| 2012/0158289 A1 * | 6/2012 | Bernheim Brush et al. .. 701/425 |
| 2012/0309411 A1 | 12/2012 | MacGougan et al. | |

(Continued)

FOREIGN PATENT DOCUMENTS

| | | |
|---|---|---|
| EP | 1575328 A1 | 9/2005 |
| EP | 1796419 A1 | 6/2007 |

(Continued)

OTHER PUBLICATIONS

International Search Report and Written Opinion, International Application No. PCT/US2015/027580, Date: Jul. 30, 2015, pp. 1-9.

*Primary Examiner* — Danh Le
(74) *Attorney, Agent, or Firm* — Mannava & Kang, P.C.

(57) ABSTRACT

A system and method is described that computes an estimated current location for a client device based on both the detected current location and the predicted current location of the client device. By utilizing the predicted current location, the system and method may account for and compensate for anomalies and inaccuracies in the detected current location. Accordingly, the system and method provides a more accurate estimation for the current location of the client device based on examination of heuristics and a priori environmental data. In particular, the system and method compensates for detected locations that are impossible or improbable based on previous locations of the client device, the layout of the environment in which the client device is traversing, data describing the user of the client device, and/or data describing the client device.

20 Claims, 13 Drawing Sheets

(56) References Cited

U.S. PATENT DOCUMENTS

2014/0062790 A1\* 3/2014 Letz et al. .................... 342/386
2014/0280898 A1\* 9/2014 Voit et al. ..................... 709/224

FOREIGN PATENT DOCUMENTS

WO     WO-02/052225 A2    7/2002
WO     WO-2004/095868 A2    11/2004

\* cited by examiner

DETERMINING LOCATION BASED ON BOTH A DETECTED LOCATION AND A PREDICTED LOCATION

TECHNICAL FIELD

The present disclosure relates to determining the current location of a wireless device based on a location detected using sensor data and a location predicted using heuristic and a priori knowledge of environments surrounding the client device.

BACKGROUND

Over the last decade, there has been a substantial increase in the use and deployment of network devices. For example, smartphones, laptop computers, desktop computers, tablet computers, and smart appliances may each communicate over wired and/or wireless switching networks. Commonly, these devices may determine their location using a variety of techniques.

For example, wireless devices may determine their distance from an access point by examining characteristics of received/transmitted signals. Based on analysis of signals from multiple access points, an estimated detected location of a device may be determined. Although these techniques offer an estimated current location of a wireless device, these estimates can be inaccurate and prone to errors caused by signal anomalies.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
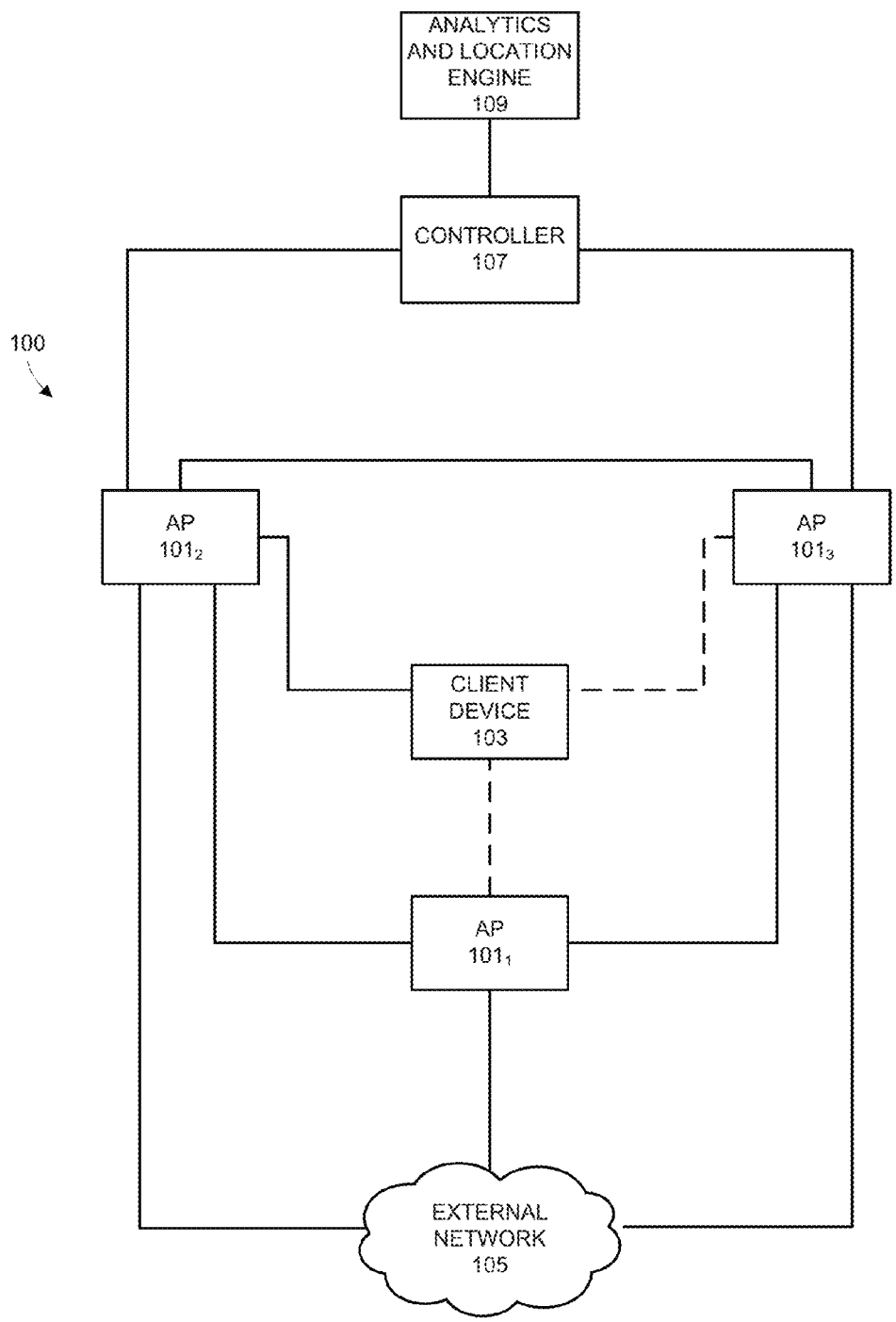
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_3$ and a client device 103. The client device 103 may be connected or associated with one or more of the access points $101_1$-$101_3$ through corresponding wireless connections with the access points $101_1$-$101_3$. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional client devices 103 and/or additional access points 101. In still other embodiments, the network system 100 may include one or more network controllers 107 and/or an analytics and/or location engine (ALE) 109, which may assist in 1) securing connections between the access points $101_1$-$101_3$ and the client device 103 and/or 2) estimating the current location of the client device 103.

Figure 2:
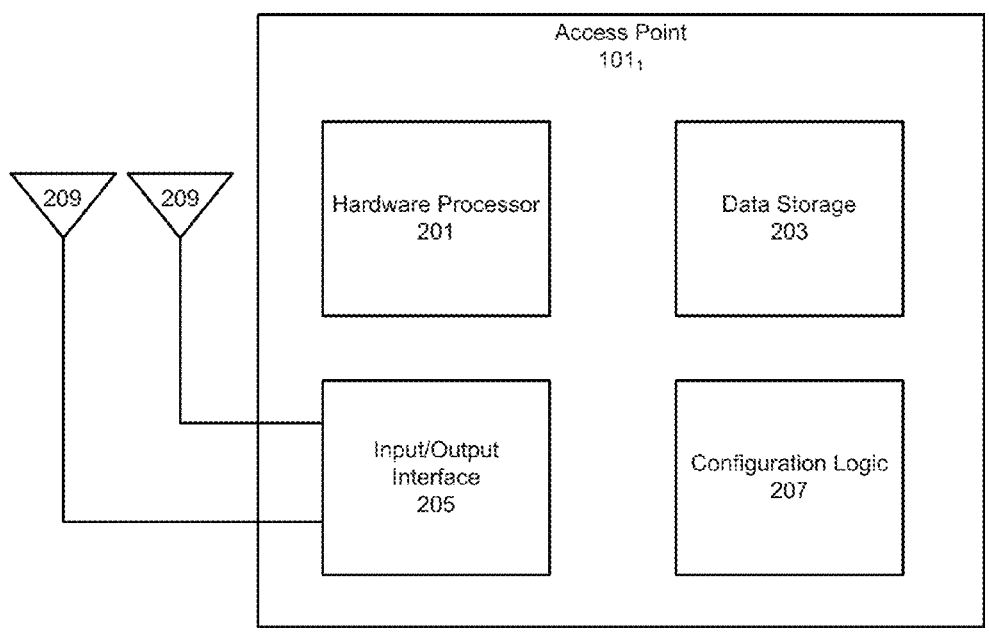
FIG. 2 shows a component diagram of the access point according to one embodiment.

The access points $101_1$-$101_3$ may be any device that can associate with the client device 103 to transmit and receive data over wireless channels and/or detect wireless signals transmitted by the client device 103. In one embodiment, the access points $101_1$-$101_3$ may correspond to a network device such as a wireless access point, a switch, a router, or any combination thereof. FIG. 2 shows a component diagram of the access point $101_1$ according to one embodiment. In other embodiments, the access points $101_2$ and $101_3$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during operations and a hierarchy of persistent memory, such as Read Only Memory (ROM), Erasable Programmable Read Only Memory (EPROM,) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the access point $101_1$ may store data to be forwarded to the client device 103 or to one or more of the access points $101_2$ and $101_3$. In another embodiment, the data storage 203 may store previously estimated locations of the client device 103 that are generated using signals received by the access point $101_1$, heuristics data associated with the client device 103, and/or a priori knowledge of environments surrounding the client device 103 and/or the access point $101_1$.

In one embodiment, the I/O interface 205 corresponds to one or more components used for communicating with other devices (e.g., the client device 103, the controller 107, the ALE 109, and/or other access points $101_2$ and $101_3$ within the system 100) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client device 103, the controller 107, the ALE 109, and/or the access points $101_2$ and $101_3$ over corresponding wireless channels in the system 100.

In some embodiments, the I/O interface 205 may include one or more antennas 209 for communicating with the client device 103, the controller 107, the ALE 109, the access points $101_2$ and $101_3$, other wireless devices in the network system 100, and/or other devices over the external network 105. For example, multiple antennas 209 may be used for forming transmission beams to one or more of the client device 103 or the access points $101_2$ and $101_3$ through adjustment of gain and phase values for corresponding antenna 209 transmissions. The generated beams may avoid objects and create an unobstructed path to the client device 103 and/or the access points $101_2$ and $101_3$.

In one embodiment, the I/O interface 205 in conjunction with the antennas 209 may detect wireless signals emitted by the client device 103. In this embodiment, the client device 103 may not be directly associated with the access point $101_1$ such that the client device 103 and the access point $101_1$ maintain a data connection, but the access point $101_1$ is able to detect the presence of the proximate/neighboring client device 103, including signal strength characteristics. For example, in FIG. 1 the dashed lines indicates that the client device 103 is visible to and/or in-range of the access points $101_1$ and $101_3$ although the access points $101_1$ and $101_3$ and the client device 103 may not share a data connection. Instead, the client device 103 is only associated and maintains a data connection with the access point $101_2$ (e.g., a data connection using one or more network protocols) as signified by the solid lines. Accordingly, each of the access points $101_1$ and $101_3$ may detect nearby signals of the client device 103 even without an established data connection. Detection of these signals by the access points $101_1$-$101_3$ may be used by to determine a detected current location of the client device 103 as will be described in greater detail below.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to determine a detected current location for the client device 103, determine a predicted current location for the client device 103, and determine an estimated current location of the client device 103 based on the detected current location and/or predicted current locations.

As described above, the other access points $101_2$ and $101_3$ may be similarly configured as described above in relation to the access point $101_1$. For example, access points $101_2$ and $101_3$ may comprise hardware processor 201, data storage 203, an input/output (I/O) interface 205, and device configuration logic 207 in a similar fashion as described above in relation to the access point $101_1$.

In one embodiment, the controller 107 and/or the ALE 109 may be similarly configured as described above in relation to the access point $101_1$. For example, the controller 107 and/or the ALE 109 may comprise hardware processor 201, data storage 203, an input/output (I/O) interface 205, and device configuration logic 207 in a similar fashion as described above in relation to the access point $101_1$.

In one embodiment, the client device 103 may be any wireless and/or wired electronic devices capable of receiving and transmitting data over wired and wireless mediums. For example, the client device 103 may be one or more of a personal computer, a laptop computer, a netbook computer, a wireless music player, a portable telephone communication device, a smart phone, a tablet computer, and a digital television. In one embodiment, the client device 103 is a digital device that includes a hardware processor, memory hierarchy, and input/output (I/O) interfaces including a wired and/or wireless interface such as an IEEE 802.3 interface. In one embodiment, the configuration of the components within the client device 103 may be similar to those discussed above in relation to the access point $101_1$.

Figure 3:
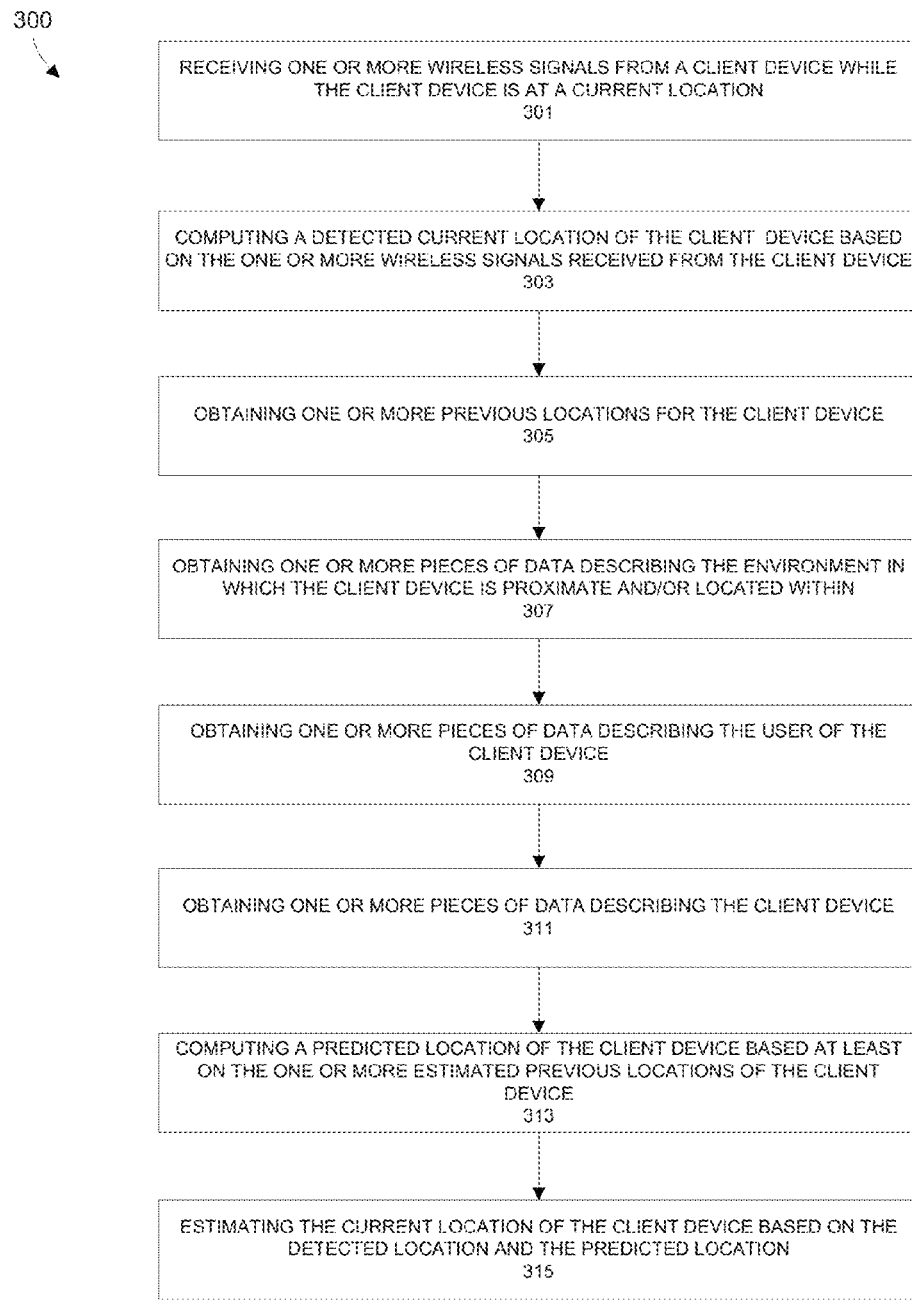
FIG. 3 shows a method for calculating the estimated current location of the client device according to one embodiment.

Turning now to FIG. 3, a method 300 for calculating the estimated current location of the client device 103 according to one embodiment will be described. In one embodiment, each operation of the method 300 may be performed by one or more components of the access points $101_1$-$101_3$ and/or the client device 103. In other embodiments, the operations of the method 300 may be performed by the controller 107 and/or the ALE 109. Although the operations of the method 300 are shown and described in a particular order, in other embodiments the operations may be performed in a different order. For example, in some embodiments, one or more of the operations of the method 300 may be performed concurrently or during overlapping time periods.

The Detected Current Location of the Client Device 103

Figure 4A:
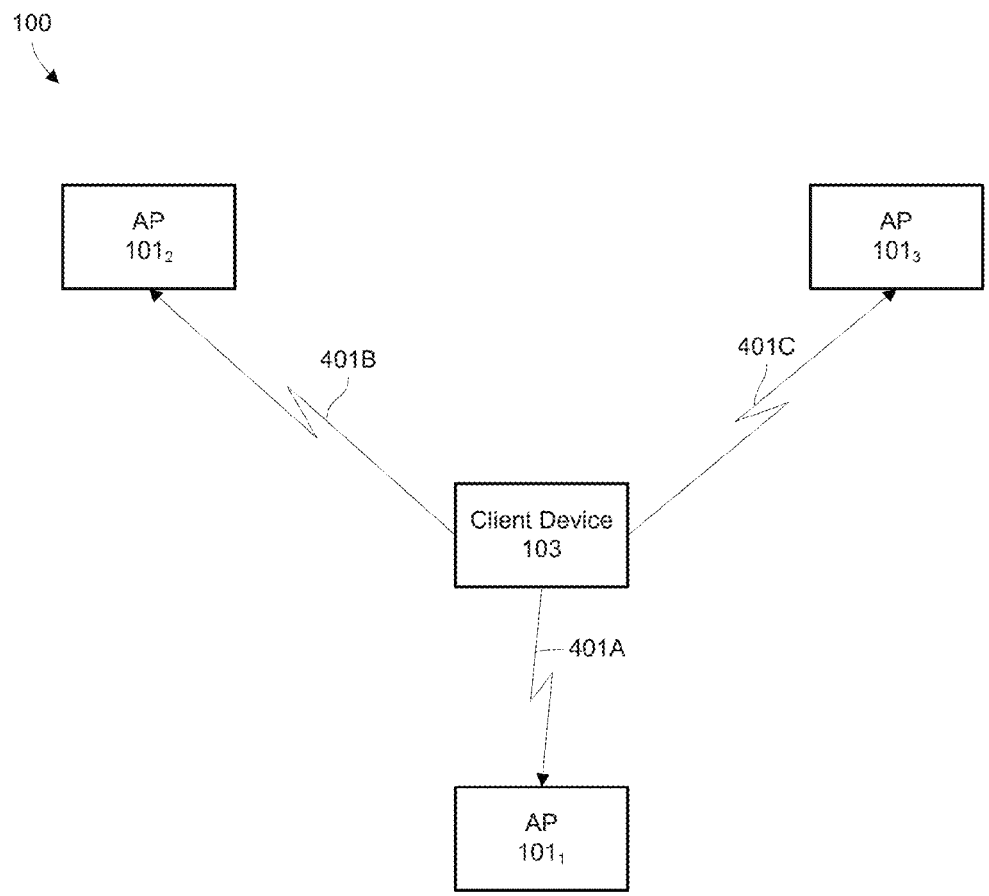
FIG. 4A shows a client device emitting wireless signals for determining the location of the client device according to one embodiment.

In one embodiment, the method 300 begins at operation 301 with the receipt by one or more of the access points $101_1$-$101_3$ of one or more wireless signals from the client device 103. For example, as shown in FIG. 4A, the client device 103 may transmit wireless signals 401 to the access points $101_1$-$101_3$. The wireless signals 401 may be transmitted by the client device 103 at a predefined power level, which is shared with the access points $101_1$-$101_3$. For instance, the wireless signals 401 may be transmitted to the access points $101_1$-$101_3$ at 20 dB. In one embodiment, the wireless signals 401 are received by the access points $101_1$-$101_3$ at operation 301 using one or more of the antennas 209 and the input/output interface 205.

In one embodiment, the received signals 401 may be transmitted as part of a data transfer or a communication involving control signals with one or more of the access points $101_1$-$101_3$. For example, the signals 401 may be part of a wireless data transfer or a communication of control signals using an established data connection between the client device 103 and the access point $101_2$ (e.g., a data connection using one or more network protocols). These wireless signals 401 may be detected by the access points $101_1$ and $101_3$ even though the access points $101_1$ and $101_3$ and the client device 103 have not established a data connection. Although described as being related to a data transfer, in other embodiments the wireless signals may be a beacon transmitted by the client device 103 with the intended purpose of determining the detected current location of the client device 103 instead of the transmission of data or control signals. Again, these wireless signals 401 may be detected by the access points $101_1$-$101_3$ even though the access points $101_1$ and $101_3$ and the client device 103 have not established a data connection.

Following receipt of the wireless signals 401, operation 303 may compute the detected current location of the client device 103. In one embodiment, the detected current location of the client device 103 may be generated based on the wireless signals 401 received at operation 301. For example, in one embodiment, operation 303 may compute the detected current location of the client device 103 using one or more received signal strength indicators (RSSIs) associated with the wireless signals 401. In this example, each of the access points $101_1$-$101_3$ may analyze the received wireless signals 401 to determine the power of these signals 401. Since these signals 401 have traversed some distance between the client device 103 and each respective access point $101_1$-$101_3$, the signals 401 may decrease in power. For instance, although the signals 401 may have originally been transmitted at 20 dB, the power of the wireless signal 401A received by the access point $101_1$ may be 18 dB, the power of the wireless signal 401B received by the access point $101_2$ may be 15 dB, and the power of the wireless signal 401C received by the access point $101_3$ may be 16 dB.

As noted above, the access points $101_1$-$101_3$ may be aware of the power with which the signals 401 were originally transmitted by the client device 103 (e.g., 20 dB). This transmitting power may be shared prior to transmitting the signals 401 or the signals 401 may themselves include this power information encoded therein.

Figure 4B:
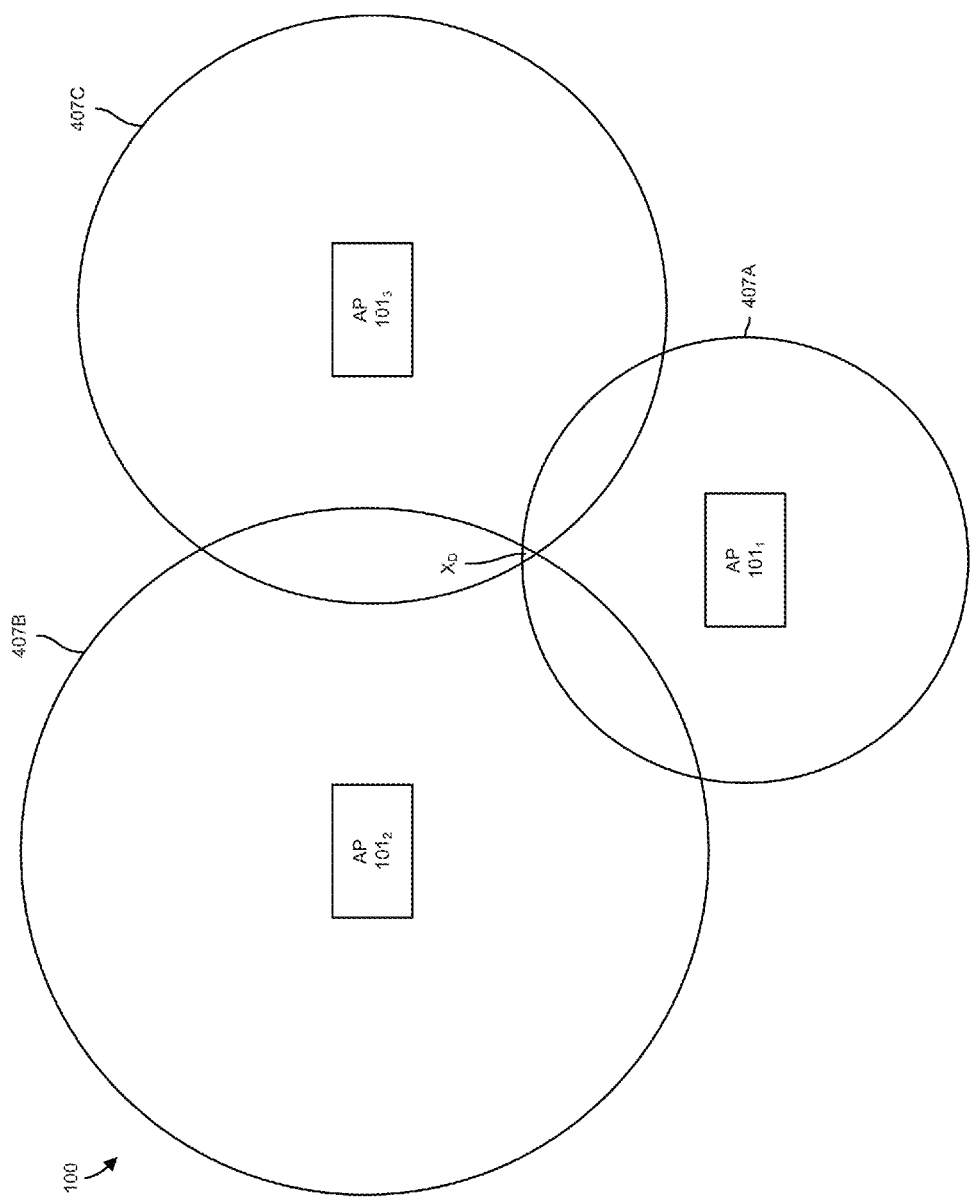
FIG. 4B shows a detected current location of the client device based on distances from access points according to one embodiment.

Based on the determined power of the wireless signals 401 at receipt and knowledge of the power of the signals 401 at transmission, each of the access points $101_1$-$101_3$ may determine a distance or range separating the client device 103 and each respective access point $101_1$-$101_3$. As shown in FIG. 4B, these distances are represented by circles 407A-407C, where the radius of the circles indicate the estimated distance between the client device 103 and each respective access point $101_1$-$101_3$. For example, using the receiving power levels of the signals described above, the client device 103 may be estimated to be five meters from the access point $101_1$, eight meters from the access point $101_2$, and six meters from the access point $101_3$. Accordingly, each of the circles 407A-407C may have radii of five meters, eight meters, and six meters, respectively. These distance estimates may be determined based on 1) estimated transfer function(s) describing signal propagation/degradation between the client device 103 and the access points $101_1$-$101_3$ and/or 2) a table mapping signal degradation to distance estimates.

Although described as a single distance estimate between the client device 103 and the access points $101_1$-$101_3$, in some embodiments, a distance range may be provided. For example, using the receiving power levels of the signals described above, the client device 103 may be estimated to be between five and six meters from the access point $101_1$, eight and nine meters from the access point $101_2$, and six and seven meters from the access point $101_3$.

Based on these estimated distances between the client device 103 and the access points $101_1$-$101_3$, operation 303 may compute a detected current location of the client device 103. In one embodiment, the detected current location may be the overlap/intersection of the circles 407A-407C. For example, as shown in FIG. 4B, the detected current location of the client device 103 may be the location $X_D$, which falls in the overlap/intersection between the circles 407A-407C.

In one embodiment, the detected current location of the client device 103 may be relative to one or more of the access points $101_1$-$101_3$. In another embodiment, based on knowledge of the location of one or more of the access points $101_1$-$101_3$, the detected current location may be relative to another object (e.g., a landmark), an area (e.g., a room in which the client device 103 and/or the access points $101_1$-$101_3$ are located, a campus, or the entire earth (i.e., GPS coordinates)).

As described above, operation 303 may triangulate the position of the client device 103 using the access points $101_1$-$101_3$ to arrive at the detected current location of the client device 103. However, in other embodiments, the detected current location of the client device 103 may be determined using a single access point 101 and beamforming techniques. For example, in this embodiment, the client device 103 may generate a beam directed at the access point $101_1$. Similar to the approach used above with multiple access points $101_1$-$101_3$, operation 303 may determine the power of the beamformed signal received from the client device 103 to determine a distance between the client device 103 and the access point $101_1$. Since the client device 103 directed a beam toward the access points $101_1$, operation 303 may determine an angle of the client device 103 in relation to the access point $101_1$. Accordingly, using the distance derived from the power of the received beamformed signal and an angle of the client device 103 in relation to the access point $101_1$, operation 303 may compute the detected current location of the client device 103 using a single access point 101. In still another embodiment, Bluetooth and/or radio frequency identifiers (RFIDs) may be used to determine the detected current location based on proximity estimates with the access points $101_1$-$101_3$ and the client device 103.

Although described above as computed by one or more of the access points $101_1$-$101_3$, in other embodiments one or more of the controller 107 and the ALE 109 may compute the detected current location of the client device 103 based on the wireless signals 401 transmitted by the client device 103. For example, the access points $101_1$-$101_3$ may detect the wireless signals 401 and pass on characteristics of the received signals 401 (e.g., RSSI values) to the controller 107 and/or the ALE 109. In this embodiment, the controller 107 and/or the ALE may thereafter compute a detected current location for the client device 103.

As described above, the detected current location of the client device 103 may be computed using RSSI for one or more wireless signals 401 transmitted by the client device 103. Although under certain conditions this value may provide an accurate estimate of the location of the client device 103, the detected current location may be inaccurate at times based on a number of factors. For example, the environment in which the wireless signals 401 are transmitted may not be in accordance with expected conditions. These anomalies may result in the wireless signals either arriving with higher or lower power levels than would be observed under normal conditions. Based on these unexpected power levels, the detected current location may be inaccurate. In other situations, other anomalies or detection errors may lead to inaccuracies in the detected current location of the client device 103.

The Predicted Current Location of the Client Device 103

To correct or compensate for anomalies in the detected current location computed at operation 303, the method 300 may utilize heuristic data and/or a priori knowledge of environments surrounding the client device 103 to arrive at one or more predicted current locations of the client device 103. As will be described in greater detail below, an estimated current location for the client device 103 may be computed using the detected current location and the one or more predicted current locations of the client device 103. By using predicted current locations, the method 300 may compensate for potential inaccuracies in the detected current location of the client device 103 and arrive at a potentially more accurate estimated current location for the client device 103.

The method 300 may begin the process of computing predicted current locations for the client device 103 at operation 305. At operation 305, one or more previous locations of the client device 103 may be obtained/received. In one embodiment, the previous locations of the client device 103 may be obtained from data stored in one or more of the access points $101_1$-$101_3$, the client device 103, the controller 107, the ALE 109, and/or another device in the network system 100. For example, the access point $101_1$ may record previously estimated locations of the client device 103 over time. These previously estimated locations may be stored in the data storage 203 in any type of data structure and/or database. In one embodiment, these previous locations may be derived from previous performances of the method 300 while in other embodiments the previous locations are derived through other techniques (e.g., from the client device 103 or a badge associated with a user of the client device 103 being scanned at a known location).

In one embodiment, the previous locations may be associated with a time. The times associated with the previous locations correspond to points in time at which the previous locations were detected and/or estimated. For example, a first previous location may be associated with the time 2:00 PM while a second previous location may be associated with the time 2:01 PM. Accordingly, the first location represents the location of the client device 103 at 2:00 PM while the second location represents the location of the client device 103 at 2:01 PM.

In one embodiment, operation 305 may obtain previous locations for the client device 103 within a designated period of time. For example, the previous locations obtained at operation 305 may be within ten seconds of the current time. By filtering on a designated time period, the method 300 eliminates previous locations that are outdated and may negatively skew computation of the estimated current location.

Following retrieval of the previous locations, operation 307 may retrieve one or more pieces of data describing the environment in which the client device 103 is proximate to and/or is located within. In one embodiment, since the exact current location of the client device 103 is not yet known, operation 307 may retrieve data describing the environment based on one or more of the previous locations retrieved at operation 305. For example, operation 307 may retrieve data describing the environment corresponding to the most recent previous location retrieved at operation 305.

Figure 5:
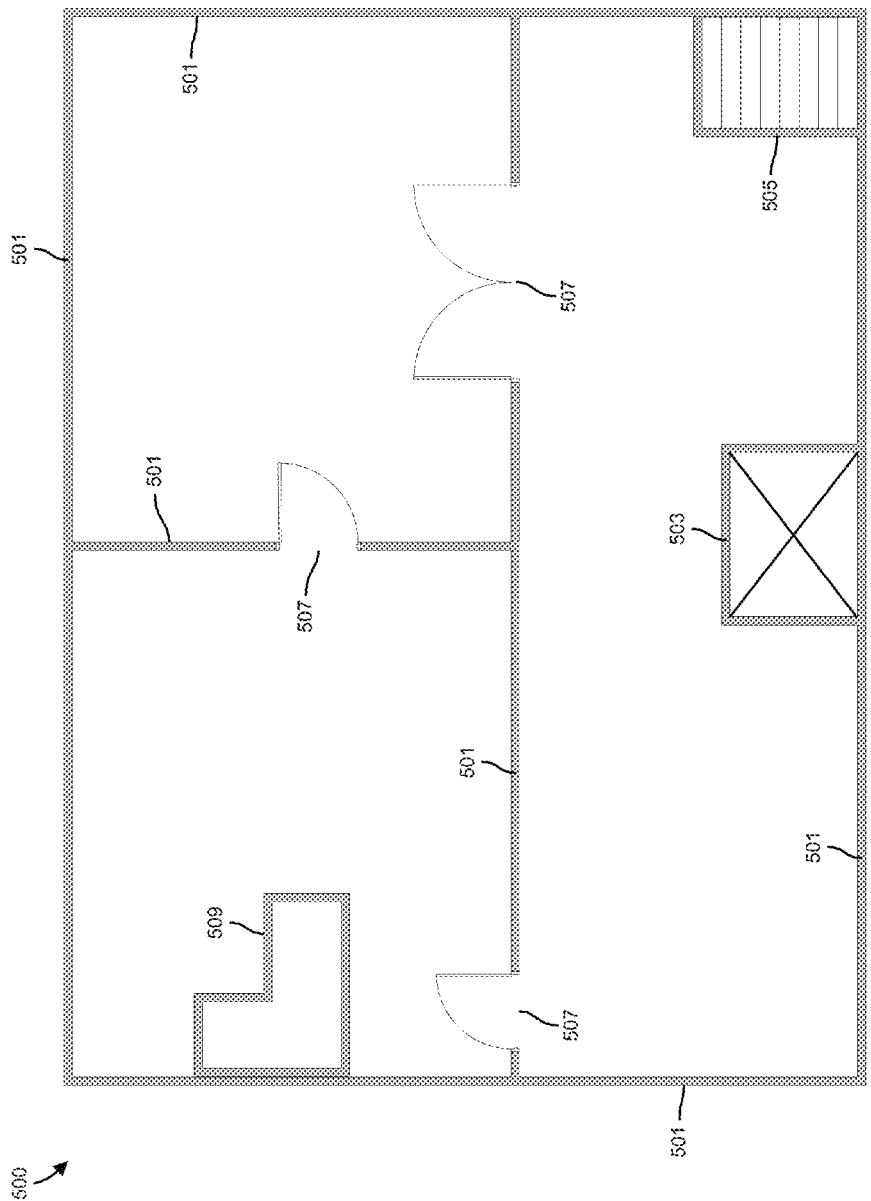
FIG. 5 shows a floor plan of a floor of a building according to one embodiment.

In one embodiment, the data retrieved at operation 307 may include floor plans and/or maps for one or more structures or areas corresponding to one or more previous locations. The floor plans and/or maps may include locations of walls, stairwells, doorways, elevators, walkways, installed fixtures, and other objects that would either prevent or assist a user of the client device 103 to walk or otherwise change location. For example, FIG. 5 shows a floor plan 500 of a floor of a building. The floor plan 500 includes indicators for walls 501, an elevator 503, a stairwell 505, doorways 507, and an installed fixture 509. As will be described in greater detail below, using knowledge of the environment and surroundings of the client device 103, the method 300 may better predict the movement and/or the current location of the client device 103.

In one embodiment, the floor plans and/or maps may be retrieved at operation 307 from a local or remote repository. For example, at operation 307 one or more of the access points 101₁-101₃ may retrieve floor plans for a building corresponding to the last known/estimated location of the client device 103 from a remote server over the external network 105.

At operation 309, the method 300 may retrieve one or more pieces of data that describe a user of the client device 103. The data may describe access privileges of the user and/or any other constraints. For instance, expanding on the example described above, the one or more pieces of data retrieved at operation 309 may include 1) areas of a building that are accessible to the user of the client device 103, 2) physical impairments of the user of the client device 103 that would prevent the user from accessing particular areas or resources of the building (e.g., stairwells based on wheelchair constraints), and/or 3) a schedule or appointment calendar associated with the user of the client device 103. Similar to operation 307, operation 309 may be performed by accessing data from a local or remote repository.

At operation 311, the method 300 may retrieve one or more pieces of data that describe the client device 103. The data may describe capabilities of the client device 103 and/or a type, model, or class of the client device 103. For example, the data retrieved at operation 311 may indicate that the client device 103 is one or more of a laptop computer, tablet computer, personal digital assistant, or mobile phone. Similar to operations 307 and 309, operation 311 may be performed by accessing data from a local or remote repository.

Turning now to operation 313, the method 300 may compute one or more predicted current locations of the client device 103 based on the data retrieved at operations 305, 307, 309, and/or 311. As will be described in greater detail below, one or more predicted current locations of the client device 103 may be computed using one or more techniques. These techniques may be used in conjunction or separately to compute the predicted current locations of the client device 103.

Prediction Based on Previous Locations

In one embodiment, a predicted location may be generated based on one or more previous locations of the client device 103. As noted above, these previous locations may be 1) previously estimated locations derived using previous performances of the method 300 and/or 2) confirmed locations of the client device 103 (e.g., the user swiping a badge at a known location). Using these previous locations, operation 313 may attempt to generate an anticipated pathway for the client device 103 within a floor plan or map retrieved at operation 307.

The pathway for the client device 103 indicates predicted movement for the client device 103 and may be used to determine a predicted location of the client device 103 at a point in time as will be described in greater detail below. In one embodiment, the predicted pathway for the client device 103 may be generated using one or more pieces of data, including 1) one or more previous locations of the client device 103, 2) the predicted direction of the client device 103, 3) the predicted velocity of the client device 103, 4) floor plans or maps for the structure or area in which the client device 103 is believed to be located, 5) one or more pieces of data that describe a user of the client device 103, and/or 6) one or more pieces of data that describe the client device 103.

Figure 6A:
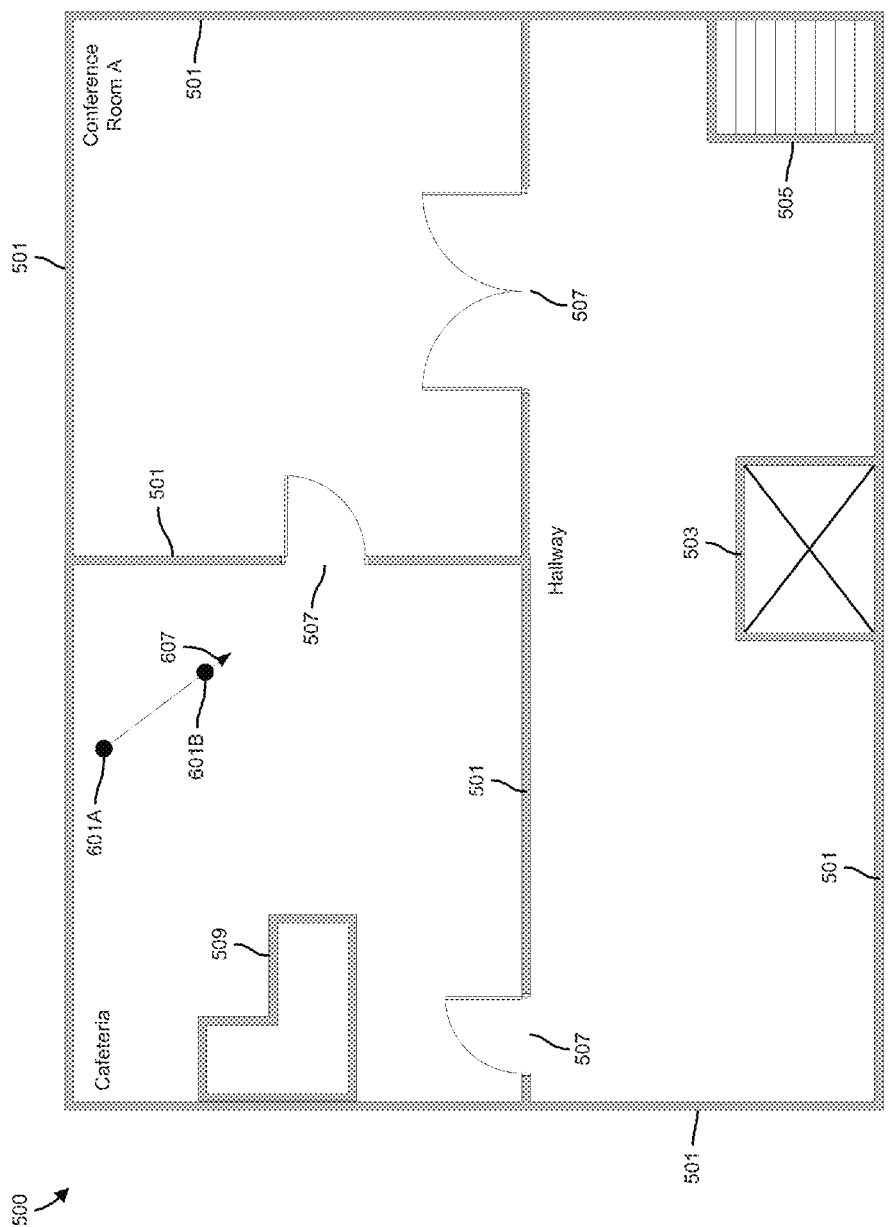
FIG. 6A shows previous locations of the client device within the floor plan according to one embodiment.

For example, as shown in FIG. 6A, two previous locations 601A and 601B for the client device 103 may be retrieved at operation 305 and overlaid on the example floor plan 500. In this example, these previous locations 601A and 601B may correspond to the times 2:01:05 PM and 2:01:35 PM, respectively. The floor plan 500 describes a floor of a building in which the client device 103 is believed to be located. In one embodiment, the determination of a floor plan may be based on the one or more previous locations of the client device 103. For example, the previous locations 601A and 601B may indicate that the client device 103 is located on the floor of the building represented by the floor plan 500. Based on this determination, operation 307 may retrieve the floor plan 500. A pathway may be generated based on these previous locations 601A and 601B and relative to the floor plan 500 as described in greater detail below.

In one embodiment, operation 313 may determine the direction of movement for the client device 103 based on the previous locations 601A and 601B. For example, since the previous location 601B was computed after the location 601A as described above, the client device 103 is likely moving in the direction indicated by the arrow 607 as shown in FIG. 6A. In other embodiments in which three or more previous locations 601 are utilized, the method 300 may generate a direction of movement for the client device 103 based on only the most recent two previous locations or may generate an average direction of movement for the client device 103 based on three or more previous locations. In one embodiment, the direction may be represented by an angle relative to an object in the floor plan 500 or the most recent previous location (e.g., the previous location 601B). In one embodiment, the pathway 603 may be generated to travel along this estimated direction of the client device 103.

In one embodiment, operation 311 may also determine the velocity of the client device 103 based on the previous locations 601A and 601B. For example, the distance between the previous locations 601A and 601B may be three meters. Based on the corresponding times noted above associated with each of the previous locations 601A and 601B, the elapsed time between the previous locations 601A and 601B is thirty seconds. Based on these time and distance values, the velocity (v) of the client device 103 may be estimated to be:

$$v = \frac{3 \text{ meters}}{30 \text{ seconds}} = 0.1 \text{ m/s}$$

Similar to computation of the estimated direction of the client device 103, in other embodiments in which three or more previous locations 601 are utilized, the method 300 may generate an average velocity based on the three or more previous locations or base the estimated velocity on only the last two most recent previous locations.

Figure 6B:
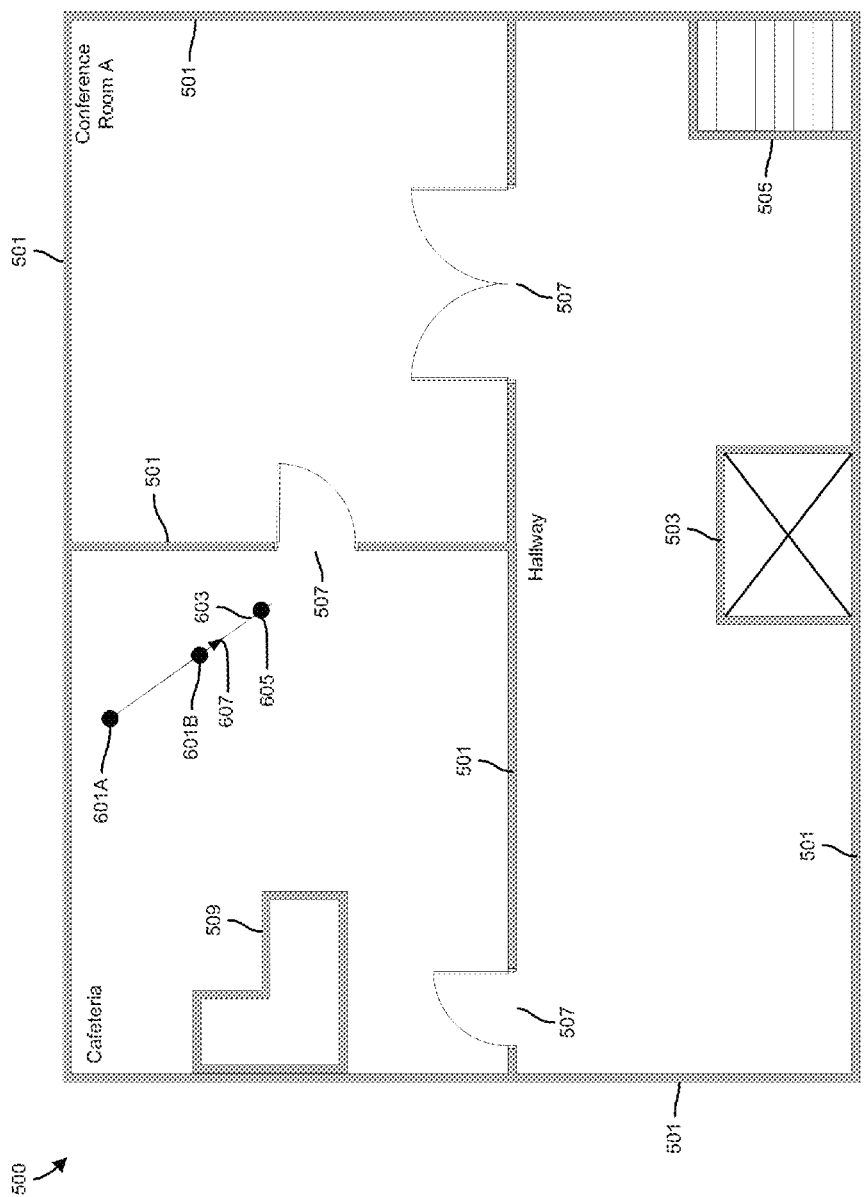
FIG. 6B shows a predicted location of the client device generated based on the previous locations of the client device according to one embodiment.

Based on this estimated velocity and the estimated direction of the client device 103, a predicted location 605 may be generated for the client device 103 along the pathway 603 as shown in FIG. 6B. For example, at the time 2:01:45 PM, the predicted location 605 may correspond to a location in the floor plan 500 one meter from the location 601B and headed in the same direction as indicated by the arrow 607.

Figure 6C:
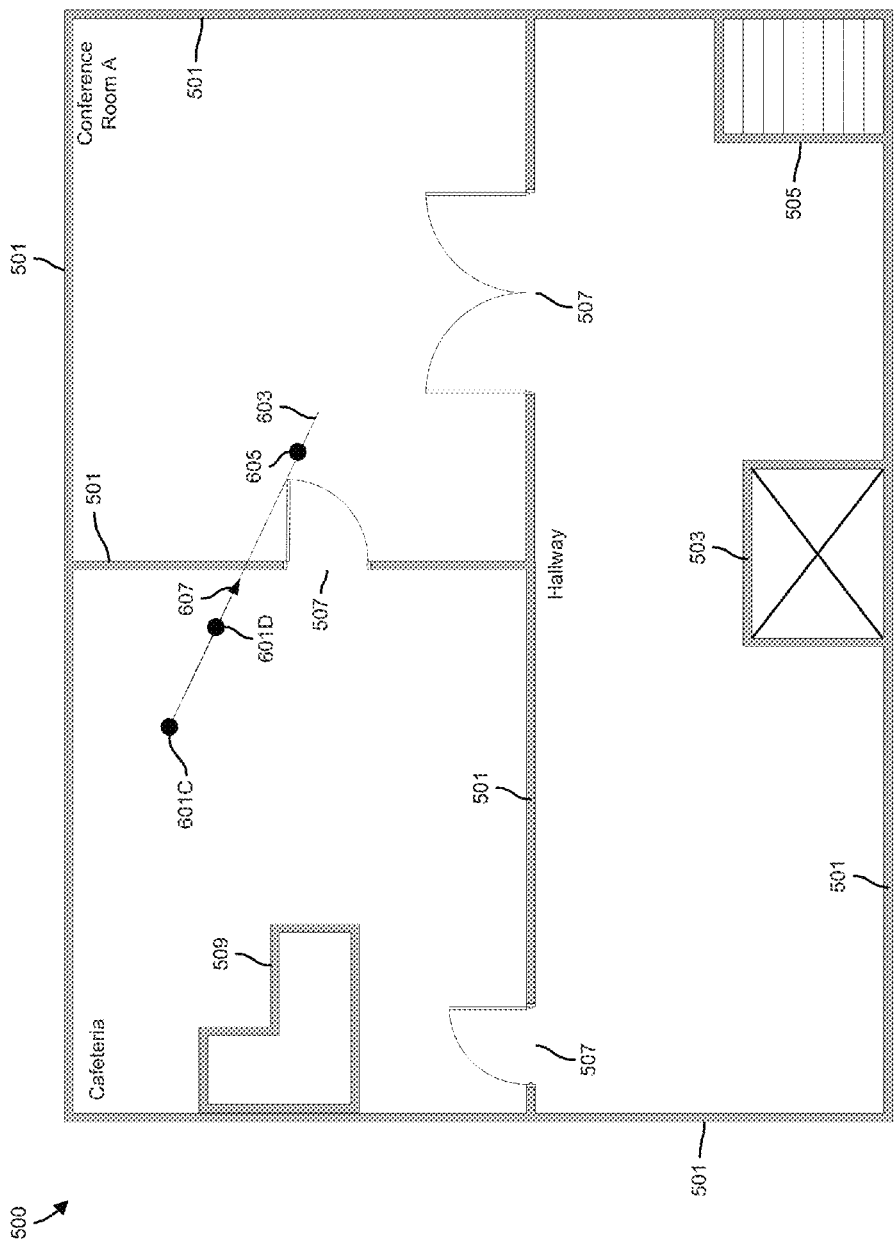
FIG. 6C shows an inaccurate predicted location of the client device generated based on the previous locations of the client device according to one embodiment.
Figure 6D:
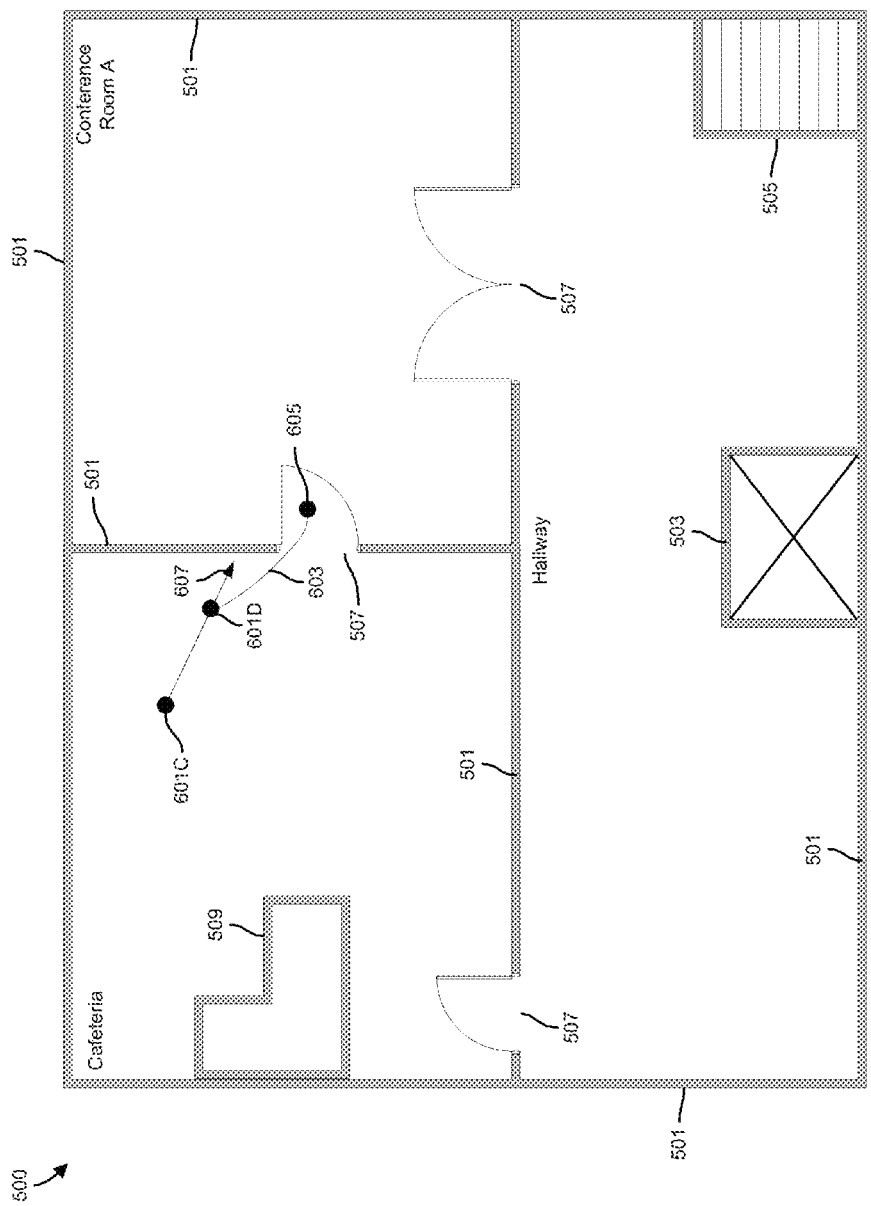
FIG. 6D shows a predicted location of the client device generated based on the previous locations of the client device and knowledge of obstacles in a building according to one embodiment.

Although shown as linear, in some embodiments, the pathway 603 may compensate for known obstacles or barriers in the floor plan 500. For example, as shown in FIG. 6C, based on the previous locations 601C and 601D, the estimated direction of the client device 103, and the estimated velocity of the client device 103, the predicted location 605 may be computed. This predicted location 605 corresponds to a pathway 603 that requires the client device 103 to pass through a wall 501. In one embodiment, operation 313 compensates for this inaccuracy by generating a pathway 603 that accounts for this barrier. In particular, as shown in FIG. 6D operation 313 may generate the pathway 603 in a similar estimated direction, but that locates a door 507 to travel through instead of attempting to pass through the wall 501. Based on this new pathway 603 and the estimated velocity of the client device 103, a new predicted current location 605 for the client device 103 may be computed. As shown, the new predicted location 605 falls on the new pathway 605, but does not travel through any barriers (e.g., a wall 501).

Prediction Based on Target Location

In some embodiments, the pathway 603 may be generated based on a target location for the client device 103 as dictated by a schedule or appointment calendar. For example, a calendar application running on the client device 103 or associated with the user of the client device 103 may indicate that the user is expected at a meeting in conference room A at 3:00 PM. Accordingly, based on this information, the pathway 603 may be generated to connect the last previous location of the client device 103 with the target location of the client device 103 (e.g., conference room A). In this embodiment, the predicted current location of the client device 103 may follow along this pathway 603 such that the client device 103 is located within conference room A at or around 3:00 PM.

In some embodiments, the previous locations of the client device 103 may be used to determine a historic movement trend for the client device 103. For example, previous locations of the client device 103 may indicate that the client device 103 is located in a cafeteria area of a building each day at 12:30 PM. Based on this historic trend, operation 313 may predict that the client device 103 will likely be in the cafeteria area at 12:30 PM or headed to the cafeteria area around 12:30 PM. Accordingly, a pathway 603 may be targeted to the cafeteria area and/or a predicted location 605 for the client device 103 at 12:30 PM may be within the cafeteria area.

Prediction Based on Access Privileges

Figure 6E:
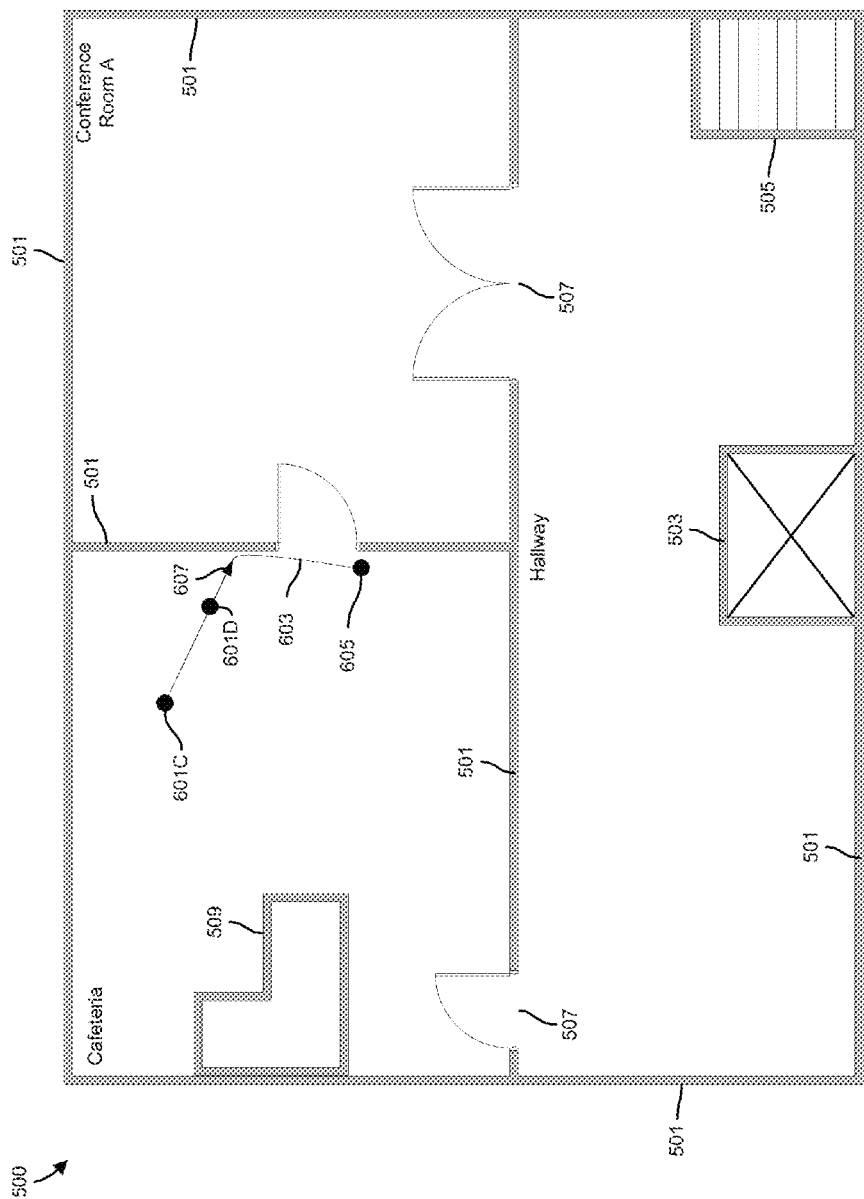
FIG. 6E shows a predicted location of the client device generated based on the previous locations of the client device and access privileges of a user of the client device according to one embodiment.

In some embodiments, access privileges for the user of the client device 103 may be used to generate the pathway 603. For example, the access privileges of the user of the client device 103 may be retrieved at operation 309 and define the areas of a building and/or campus accessible to the user of the client device 103. For instance, access privileges may indicate that the user of the client device 103 is not allowed to enter a particular room shown in the building and/or campus. Although an originally generated pathway 603 may have indicated that the client device 103 is within this restricted room, operation 313 may modify this pathway 603 to more accurately predict that the client device 103 is at a location in which the user is allowed access. For example, as shown in FIG. 6D, the pathway 603 may lead into conference room A. However, upon determining that access privileges associated with the user of the client device 103 do not allow the user access to conference room A, operation 313 may generate a pathway 603 that avoids conference room A as shown in FIG. 6E. Based on this new pathway 603, a corresponding predicted current location 605 for the client device 103 may be generated.

Prediction Based on Characteristics of the Client Device 103

In other embodiments, characteristics of the client device 103 may assist in determining the pathway 603 and/or the predicted current location 605 of the client device 103. For example, data retrieved at operation 311 may include the style of the client device 103 (e.g., a smartphone, a laptop, etc.). Since laptops are traditionally not brought into restrooms, a pathway 603 and/or predicted location 605 that places a laptop client device 103 in a restroom may be adjusted to instead avoid the restroom. In contrast, since phones are often brought into restrooms, a pathway 603 and/or predicted location 605 that places a phone client device 103 in a restroom may not be adjusted.

As described above, a predicted current location of the client device 103 may be computed based on heuristics and a priori knowledge of environments surrounding the client device 103. As will be described in greater detail below, this predicted location of the client device 103 computed at operation 313 may be combined with the detected location of the client device 103 computed at operation 303 to generate an estimated current location of the client device 103. This estimated current location may correct for inaccuracies in the detected location introduced by anomalies in the environment and detection errors.

Computing an Estimated Current Location for the Client Device 103

As noted above, following the computation of the detected current location and the predicted current location, operation 315 may compute an estimated current location for the client device 103 based on the detected current location and the predicted current location. In one embodiment, the detected current location may be averaged with the predicted current location of the client device 103 to determine the estimated current location of the client device 103. For example, in FIG. 7 the detected current location 701 may be represented by the coordinates (6 meters, 4 meters) relative to the top left most portion of the floor plan 500. This detected current location 701 may have been computed using operation 303 described above. In contrast, the predicted current location 703 may be represented by the coordinates (8 meters, 6 meters) relative to the top left most portion of the floor plan 500. This predicted current location 703 may have been computed using operation 313 described above. On the basis of these two sets of coordinates, the estimated current location 705 of the client device 103 may be computed as:

$$\text{estimated current location} = \left(\frac{6+8}{2}, \frac{4+6}{2}\right) = (7 \text{ meters}, 5 \text{ meters})$$

Figure 7:
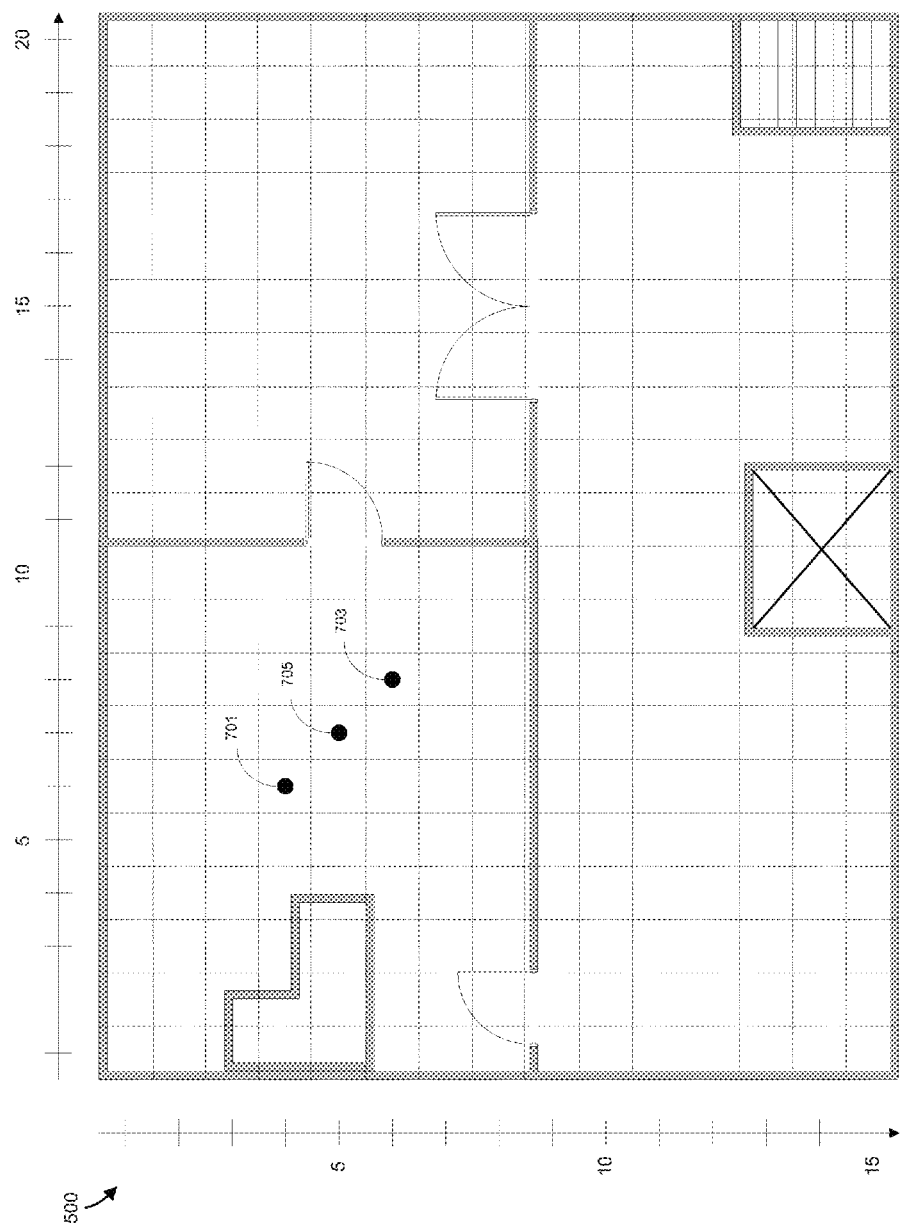
FIG. 7 shows an estimated current location of the client device that was computed based on the detected current location and the predicted current location of the client device according to one embodiment.

As shown in FIG. 7, the estimated current location 705 may sit directly between the detected current location 701 and the predicted current location 703.

Figure 8:
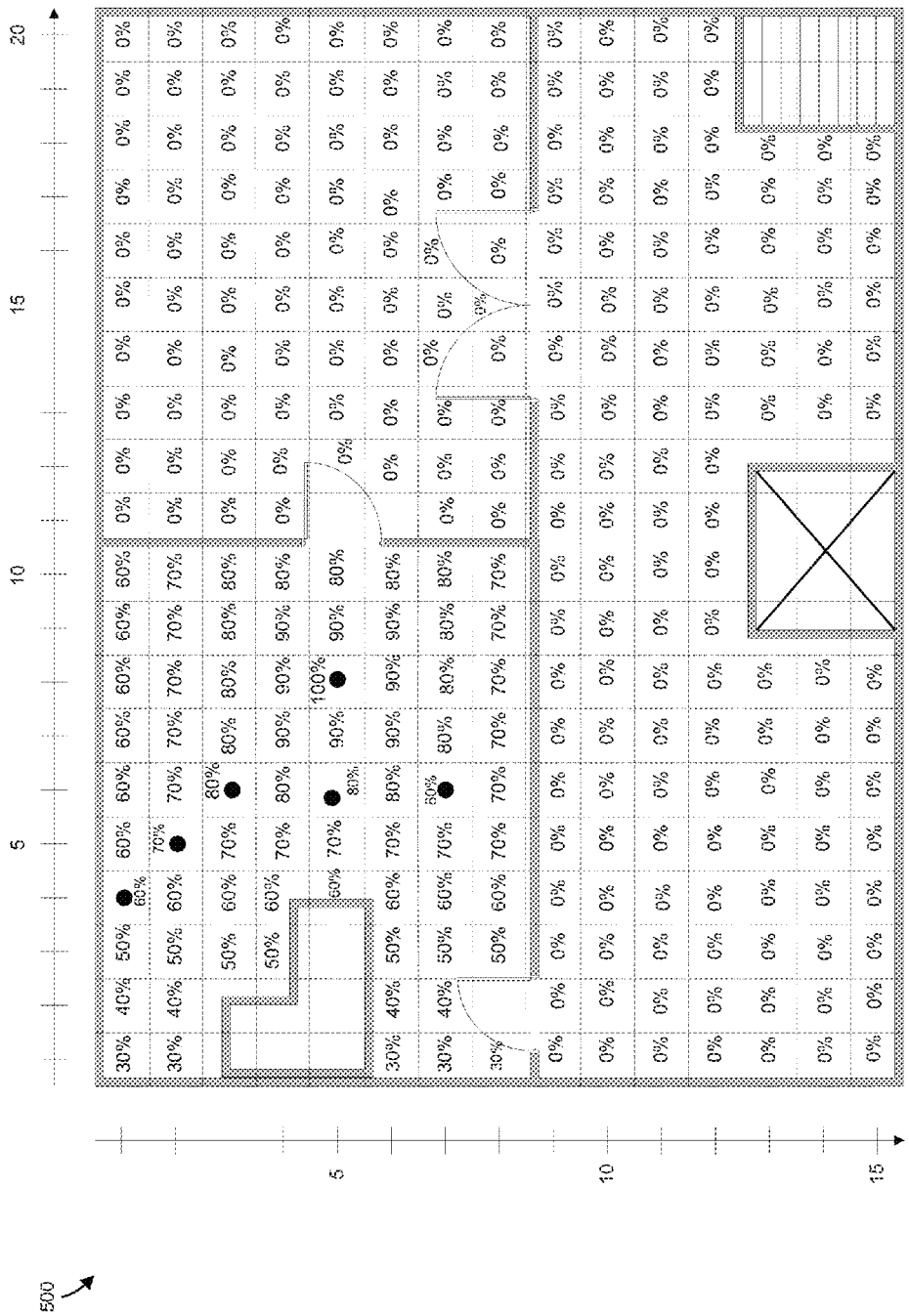
FIG. 8 shows an estimated current location of the client device that was computed based on weights applied to the detected current location and the predicted current location of the client device according to one embodiment.

In other embodiments, the combination of the detected current location and the predicted current location to generate the estimated current location may utilize weights. The weights may be assigned to each of the detected and predicted locations and indicate the level of confidence for each value. For example, as shown in FIG. 8, the previous locations at coordinates (4,1), (5,2), and (6,3) are assigned weights of 60%, 70, and 80% respectively. In contrast, the predicted current location at coordinates (8, 5) is assigned a weight of 100%. This 100% weight indicates a high confidence that the predicted location is correct. The weights for coordinates adjacent to the predicted location decrease until a wall is reached. Since in the current example embodiment, the method 300 is certain that the client device 103 is in the room corresponding to the predicted location, weights in other rooms may be set to 0%. As shown in FIG. 8, the detected current location at coordinates (6,7) may be assigned a weight of 80%.

Based on the weights assigned to the predicted current location and the detected current location, the estimated current location for the client device 103 may be computed.

Using the example described above and shown in FIG. 8, the estimated current location may be computed as follow:

$$\text{estimated current } loc. = \left( \frac{(100\% \times 8) + (80\% \times 6)}{2}, \frac{(100\% \times 5) + (80\% \times 7)}{2} \right)$$

$$\text{estimated current } loc. = (6.4 \text{ meters}, 5.3 \text{ meters})$$

Accordingly, using these weights, the estimated current location at coordinates (6.4,5.3) represents a high confidence for the predicted current location and a slightly reduced confidence for the detected current location. Although shown as providing a 100% weight to the predicted current location, in other embodiments a reduced weight may be applied to the predicted current location. This lower weight may indicate a lower confidence in the heuristic or environmental data used to compute the predicted current location. For example, when the predicted current location is based on outdated data (e.g., old previous estimated or known locations of the client device 103), the weight applied to the predicted current location may be set lower.

As described above, the estimated current location represents both the detected current location and the predicted current location of the client device 103. By utilizing the predicted current location, the method 300 may account for and compensate for anomalies and inaccuracies in the detected current location. Accordingly, the method 300 provides a more accurate estimation for the current location of the client device 103 based on examination of heuristics and a priori environmental data. In particular, the method compensates for detected locations that are impossible or improbable based on previous locations of the client device 103, the layout of the environment in which the client device 103 is traversing, data describing the user of the client device, and/or data describing the client device 103.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method, comprising:
   identifying, by a computing device including one or more processors, a previously generated location for a wireless device;
   determining a predicted location for the wireless device using the previously generated location for the wireless device;
   identifying a detected location for the wireless device, wherein the detected location is determined using a wireless signal associated with the wireless device;
   using the predicted location for the wireless device to compensate for an inaccuracy in the detected location for the wireless device; and
   determining a new generated location for the wireless device according to the compensated detected location.

2. The method of claim 1, wherein identifying the detected location for the wireless device includes determining the detected location for the wireless device using a wireless locating technique.

3. The method of claim 1, wherein determining the predicted location for the wireless device includes identifying data describing an environment, and wherein determining the predicted location for the wireless device includes using the data describing the environment.

4. The method of claim 1, further comprising: determining a predicted pathway for the wireless device, wherein determining the predicted location for the wireless device includes using the predicted pathway for the wireless device.

5. The method of claim 4, wherein determining the predicted pathway for the wireless device includes using one or more previously generated locations for the wireless device.

6. The method of claim 4, wherein determining the predicted pathway for the wireless device includes determining a predicted direction for the wireless device.

7. The method of claim 4, wherein determining the predicted pathway for the wireless device includes determining a predicted velocity for the wireless device.

8. The method of claim 4, wherein determining the predicted pathway for the wireless device includes determining historic movement trends for the wireless device using one or more previously generated locations for the wireless device.

9. The method of claim 4, wherein determining the predicted pathway for the wireless device includes using data describing an environment.

10. The method of claim 4, wherein determining the predicted pathway for the wireless device includes using schedule information for a user associated with the wireless device.

11. The method of claim 4, wherein determining the predicted pathway for the wireless device includes using characteristics of the wireless device.

12. The method of claim 1, wherein determining the new generated location for the wireless device includes computing the new generated location for the wireless device using the predicted location for the wireless device and the detected location for the wireless device.

13. The method of claim 1, further comprising identifying weighting factors for the predicted location and the detected location, and wherein using the predicted location to compensate for an inaccuracy in the detected location further comprises computing a weighted average using the predicted location for the wireless device, the detected location for the wireless device, and the weighting factors.

14. The method of claim 1, further comprising identifying weighting factors for the predicted location and the detected location, and wherein one or more weighting factors are associated with a confidence or uncertainty in a location for the wireless device.

15. The method of claim 1, further comprising identifying weighting factors for the predicted location and the detected location, and wherein one or more weighting factors are associated with schedule information for the wireless device or a user associated with the wireless device.

16. The method of claim 1, further comprising identifying weighting factors for the predicted location and the detected location, and wherein one or more weighting factors are associated with access privilege information for the wireless device or a user associated with the wireless device.

17. The method of claim 1, further comprising identifying weighting factors for the predicted location and the detected location, and wherein one or more weighting factors are associated with characteristics of the wireless device.

18. The method of claim 1, further comprising identifying weighting factors for the predicted location and the detected location, and wherein one or more weighting factors are associated with a determination time or age of a location for the wireless device.

19. A system comprising:
one or more processors; and
a non-transitory computer readable storage medium communicatively coupled to the one or more processors, wherein the non-transitory computer readable storage medium includes instructions that, when executed by the one or more processors, cause the one or more processors to:
identify a previously generated location for a wireless device;
determine a predicted location for the wireless device using the previously generated location for the wireless device;
identify a detected location for the wireless device, wherein the detected location is determined using a wireless signal associated with the wireless device; and
use the predicted location for the wireless device to compensate for an inaccuracy in the detected location for the wireless device; and
determine a new generated location for the wireless device according to the compensated detected location.

20. A non-transitory computer readable medium comprising instructions that, when executed by one or more processors, cause the one or more processors to:
identify a previously generated location for a wireless device;
determine a predicted location for the wireless device includes using the previously generated location for the wireless device;
identify a detected location for the wireless device, wherein the detected location is determined using a wireless signal associated with the wireless device; and
use the predicted location for the wireless device to compensate for an inaccuracy in the detected location for the wireless device; and
determine a new generated location for the wireless device according to the compensated detected location.

* * * * *